United States Patent [19]
Hamada

[11] Patent Number: 5,703,711
[45] Date of Patent: Dec. 30, 1997

[54] IN-LINE OPTICAL AMPLIFIER

[75] Inventor: Satoshi Hamada, Tokyo, Japan

[73] Assignee: NEC Corporation, Tokyo, Japan

[21] Appl. No.: 659,934

[22] Filed: Jun. 7, 1996

[30] Foreign Application Priority Data

Jun. 9, 1995 [JP] Japan ................ 7-143034

[51] Int. Cl.$^6$ .................................................. H01S 3/00
[52] U.S. Cl. ........................................ 359/341; 359/177
[58] Field of Search .............................. 359/341, 177

[56] References Cited

U.S. PATENT DOCUMENTS

| | | | |
|---|---|---|---|
| 5,374,973 | 12/1994 | Maxham et al. | 359/341 |
| 5,517,351 | 5/1996 | Hatakeyama | 359/341 |
| 5,563,731 | 10/1996 | Asahi | 359/341 |
| 5,633,750 | 5/1997 | Nogiwa et al. | 359/341 |

FOREIGN PATENT DOCUMENTS

| | | |
|---|---|---|
| 3252230 | 11/1991 | Japan . |
| 4207645 | 7/1992 | Japan . |

Primary Examiner—Mark Hellner
Attorney, Agent, or Firm—Whitham, Curtis, Whitham & McGinn

[57] ABSTRACT

An in-line optical amplifier includes a pumping source, a rare-earth element doped fiber amplifier, a gain regulator and a noise detector. An input power and an output power of the in-line optical amplifier are detected from the input optical signal and the output optical signal, respectively, and then they are used to detect a resultant gain of the in-line optical amplifier. The gain regulator controls the pumping light emitted by a pumping source such that the gain of the rare-earth element doped fiber amplifier is increased and a gain deviation of the resultant gain from a predetermined gain is reduced. The noise detector detects an internal noise or a noise figure based on the gain deviation, for example, by detecting the intensity of the pumping light or the magnitude of drive current of the pumping source.

36 Claims, 5 Drawing Sheets

IN-LINE OPTICAL AMPLIFIER

BACKGROUND OF THE INVENTION

1. Field of the Invention

The present invention relates to an optical amplifier and, more specifically, to an in-line optical amplifier containing an in-line amplifying element and pumping source controller.

2. Description of the Prior Art

Optically pumped rare-earth element doped fibers, typically Er(erbium)-doped fibers, are well known as in-line optical amplifiers which have advantages such as high gain, low noise, polarization independency. Such an in-line optical fiber amplifier is generally used in each repeater of an optical transmission system. Since each repeater is designed to compensate for transmission losses, the gain control of the in-line optical fiber amplifier is indispensable.

One of gain detection methods has been disclosed in Japanese Patent Laid-open Publication No. 4-207645. According to this method, an optical signal amplified by an in-line optical fiber amplifier branches into two optical signals. One branched signal is input to an optical fiber for delay and then the delayed branched signal is combined with the other branched signal to generate a beat signal. By using such a homodyne detection method, the gain of the in-line optical fiber amplifier is accurately obtained without effects of spontaneous emission light.

In a repeater of the optical transmission system, generally, the regulation control of its output light intensity is performed by adjusting the pumping light power. Therefore, by detecting the pumping light intensity, its input light intensity can be estimated and the gain of the in-line optical fiber amplifier is obtained. As disclosed in Japanese Patent Laid-open Publication No. 3-252230, a terminal administration station of the transmission system can check whether any repeater is suffering failures in the transmission system by detecting the pumping light component of each repeater from optical signals received through the repeater of the optical transmission line.

However, the conventional amplifier like these cannot detect an internal noise component of its own, which is known as a noise figure defined by (Si/Ni)/(So/No), where Si/Ni is an input signal-to-noise ratio and So/No is an output signal-to noise ratio. In other words, the optical deterioration occurring in its own optical amplifier cannot be detected. Therefore, in the case of a long-haul transmission system including a number of repeater, the terminal administration station cannot easily specify a failure location causing the deterioration of transmission quality, resulting in difficulty in ensuring efficient, reliable commnunications.

SUMMARY OF THE INVENTION

An object of the present invention is to provide an inline optical amplifier which enables detecting an increase of an internal noise occurring in the in-line optical amplifier of its own.

Another object of the present invention is to provide an in-line optical amplifier which enables checking whether an internal noise occurs with exceeding a predetermined level and generating an alarm signal when the internal noise exceeds the predetermined level.

Still another object of the present invention is to provide an in-line optical amplifier which can improve the reliability of a multiple-repeater optical transmission system.

Further still another object of the invention is to provide a repeater containing an in-line optical amplifier which enables a network controller to specify which repeater is deteriorating in noise figure before failure.

According to the present invention, an input power and an output power of an amplifier are detected from the input optical signal and the output optical signal, respectively, and then they are used to detect a resultant gain of the amplifier which means an overall or total gain of the amplifier. A gain regulation control is performed based on a difference between the resultant gain and a predetermined gain. At the same time, an internal noise or a noise figure of the amplifier is detected based on the difference between the resultant gain and the predetermined gain.

More specifically, input and output power detectors detects the input power and the output power from the input optical signal and the output optical signal, respectively. After the input power is detected from the input optical signal, an in-line amplifier optically amplifies the input optical signal with a gain varying in accordance with an intensity of pumping light. Based on the input power and the output power, a gain detector detests the resultant gain and a gain controller adjusts the intensity of the pumping light such that the resultant gain is kept at the predetermined gain. A physical quantity associated with a deviation of the resultant gain of the circuit from the predetermined gain is detected while adjusting the intensity of the pumping light such that the resultant gain is kept at the predetermined gain. The physical quantity may be the intensity of the pumping light, a magnitude of current converted into the pumping light, or the deviation of the resultant gain from the predetermined gain. Therefore, a noise detection signal indicating that an optical loss occurs within the amplifier can be produced when the physical quantity exceeds a predetermined level.

Further, the optical amplifier according to the present invention can detect the noise figure deterioration of its own before the optical amplifier falls into failure. Therefore, it is suitable for in-line amplification in an optical transmission system. For example, each repeater of the optical transmission system preferably employs the optical amplifier according to the present invention. Furthermore, each repeater may be provided with a transmitting function of an alarm signal produced by the optical amplifier. In such a system, a terminal administration station can easily specify a repeater whose noise figure is deteriorating before it falls into failure.

DESCRIPTION OF THE PREFERRED EMBODIMENTS

Figure 1:
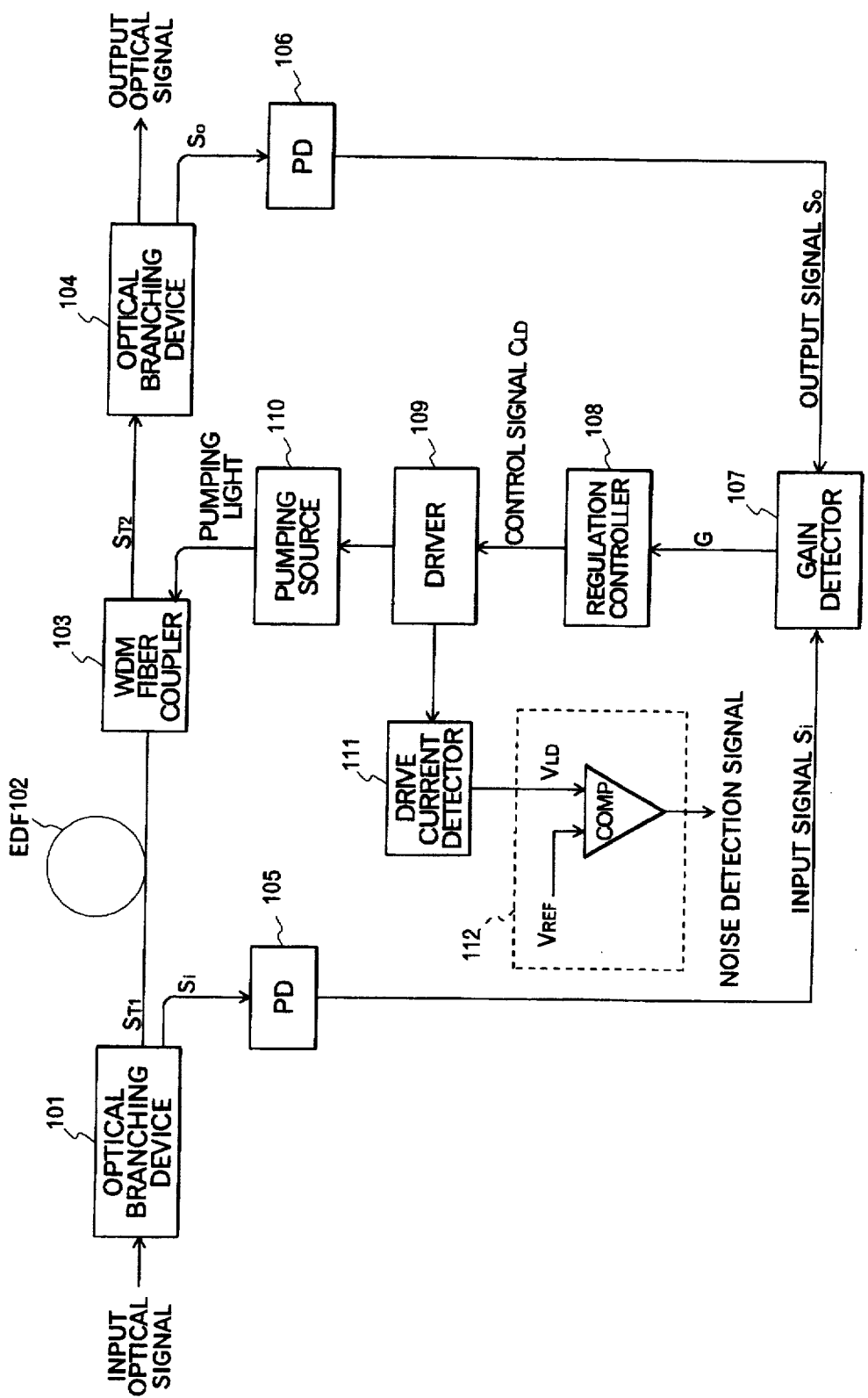
FIG. 1 is a block diagram illustrating a first embodiment of an in-line optical amplifier according to the present invention.

Referring to FIG. 1, an input optical signal is input to an optical branching device 101 which branches it into a transmission optical signal $S_{T1}$ and an input detection optical signal $S_i$. The transmission optical signal $S_{T1}$ is amplified by an Er-doped fiber amplifier (EDF) 102 receiving a pumping light. The amplified transmission optical signal $S_{T1}$ is input to a WDM (wavelength division multiplexing) fiber coupler 103 where it is wavelength-multiplexed with the pumping light. The transmission optical signal $S_{T2}$ is transferred from the WDM fiber coupler 103 to an optical branching device 104 which branches it into an output optical signal and an output detection optical signal $S_o$.

Based on the input detection optical signal $S_i$ and the output detection optical signal $S_o$, a gain regulator controls the intensity of the pumping light and an internal noise detector detects the noise figure deterioration of the in-line optical amplifier of its own.

More specifically, the input and output detection optical signals $S_i$ and $S_o$ are converted into electrical signals $S_i$ and $S_o$ by photodiodes 105 and 106, respectively. Receiving the input and output detection signals $S_i$ and $S_o$, a gain detector 107 produces a resultant gain G of the in-line optical amplifies by calculating the power ratio of the output detection signal $S_o$ to the input detection signal $S_i$. Using the resultant gain G received from the gain detector 107, a regulation controller 108 controls a LD driver 109 such that the intensity of the pumping light is changed so as to keep the resultant gain of the in-line optical amplifier at a predetermined gain level. The LD driver 109 outputs the drive current to a pumping source 110 such as a laser diode (LD) under the control of the regulation controller 108. In this manner, the resultant gain of the in-line optical amplifier is kept at the predetermined level.

In this emobodiment, the in-line optical amplifier in further provided with a drive current detector 111 and a comparator 112. The drive current detector 111 detects the magnitude of a drive current which is being supplied to the pumping source 110 and produces the voltage $V_{LD}$ corresponding to the magnitude of the drive current. The comparator 112, receiving the voltage $V_{LD}$ from the drive current detector 111, compare it to a reference voltage $V_{REF}$ to produce a noise detection signal. The noise detection signal goes high when the voltage $V_{LD}$ exceeds the reference voltage $V_{REF}$, and goes low otherwise, which may be used as an alarm signal indicating that optical losses occurring in the in-line optical amplifier are too high to efficiently and reliably amplify the input optical signal.

Figure 2:
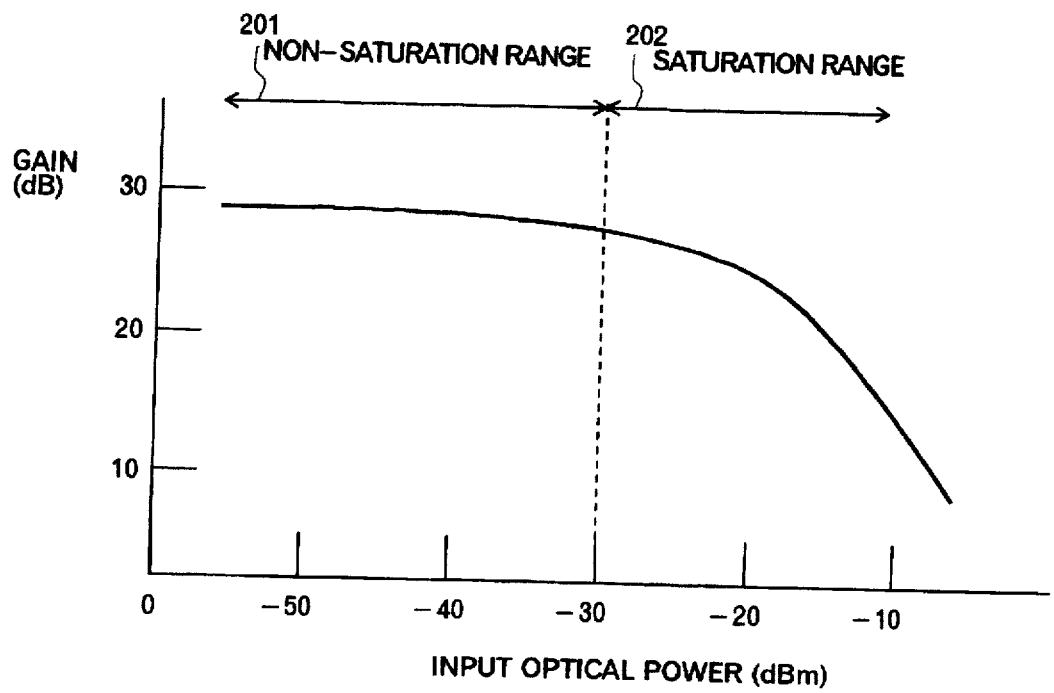
FIG. 2 is a graph showing gain characteristics of the in-line optical amplifier in respect to input optical power.

As shown in FIG. 2, the gain of the in-line optical amplifier varies depending on the input optical power when the pumping light intensity is constant, that is, the drive current of the pumping source 110 is kept constant. In cases where the input optical power is −30 dBm or less, the gain is kept at approximately a constant level (here, about 30 dB) regardless of the input optical power. This range is referred to as a non-saturation range 201. On the other hand, in cases where the input optical power is −30 dBm or more, the gain becomes lower in accordance with the increased input optical power. This range is referred to as a saturation range 202. In other words, when receiving an input optical signal of a relatively low optical power (lower than −30 dBm), the in-line optical amplifier exhibits the constant gain characteristic regardless of the input optical power even in the case of a constant drive current for the pumping source 110. On the other hand, when receiving an input optical signal of a relatively high optics power (higher than −30 dBm), the in-line optical amplifier exhibits the decreasing gain characteristic according to the input optical power in the case of the constant drive current for the pumping source 110. Therefore, in this case, the constant gain characteristic regardless of the input optical power can be obtained by the regulation controller 108 adjusting the drive current for the pumping source 110.

In the non-saturation range operation of the in-line optical amplifier as shown in FIG. 2, consider that an optical element provided in its input side, such as the optical branching device 101, increases in optical loss by 1 dB, for example. In this case, the resultant gain of the in-line optical amplifier cannot be kept constant without increasing the gain of the Er-doped fiber 102 by the same amount. Therefore, when receiving a decreased gain detected by the gain detector 107, the regulation controller 108 increases the LD driver current by controlling the LD driver 109.

Figure 3:
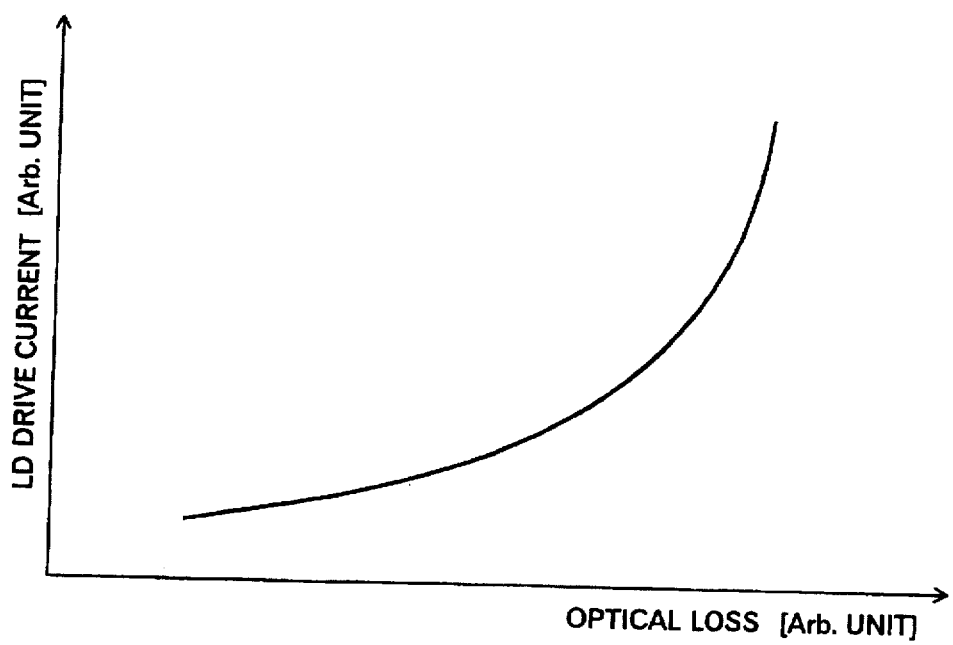
FIG. 3 is a schematic graph showing the relationship between an optical loss and a pumping LD drive current in the in-line optical amplifier.

As shown in FIG. 3, the regulation controller 108 of this embodiment increases the LD driver current according to the optical loss occurring in the input side so as to compensate for an increase of the optical loss. The optical loss can be estimated by monitoring a decrease of the detected gain received from the gain detector 107. Needless to say, optical losses are caused by not only input-side optical elements but also output-side optical elements of the in-line optical amplifier. However, in terms of noise figure deterioration, the effects of output-side optical elements are negligible since the light intensity of an input optical signal before amplification is much smaller than that after amplification.

From another point of view, it is found from the LD drive current curve as shown in FIG. 3 that the optical loss occurring inside can be detected by monitoring an increase of the LD drive current supplied to the pumping source 110. Therefore, an increase of the optical loss in the in-line optical amplifier, especially in the input side thereof, can be detected by monitoring a change of the LD drive current.

As described above, the drive current detector 111 detects the magnitude of the LD drive current supplied from the driver 109 to the pumping source 110 and produces the voltage $V_{LD}$ corresponding to the magnitude of the LD drive current. The voltage $V_{LD}$ is compared to the reference voltage $V_{REF}$ by the comparator 112. The comparator 112 produces a comparison signal of the value 1 when the voltage $V_{LD}$ exceeds the reference voltage $V_{REF}$ and a comparison signal of the value 0 when the voltage $V_{LD}$ is not higher than the reference voltage $V_{REF}$. Such a comparison signal is used as a noise alarm signal indicating that an internal optical loss is too high to efficiently and reliably amplify the input optical signal. Therefore, the comparator 112 serve as a noise detector or a noise figure deterioration detector. Needless to say, the detected voltage $V_{LD}$ may be used as a noise detection signal.

In the case where the comparison signal of the comparator 112 is used as an alarm signal, the comparison signal is output to a failure supervisory system (not shown in FIG. 1) provided in the in-line optical amplifier, where it is used to maintain the repeater containing the in-line optical amplifier. Further, in the case where the comparison signal of each repeater is transmitted to the terminal administration station through the optical transmission line, the terminal administration station can easily specify a repeater deteriorating in noise figure before the repeater failure occurs.

Figure 4:
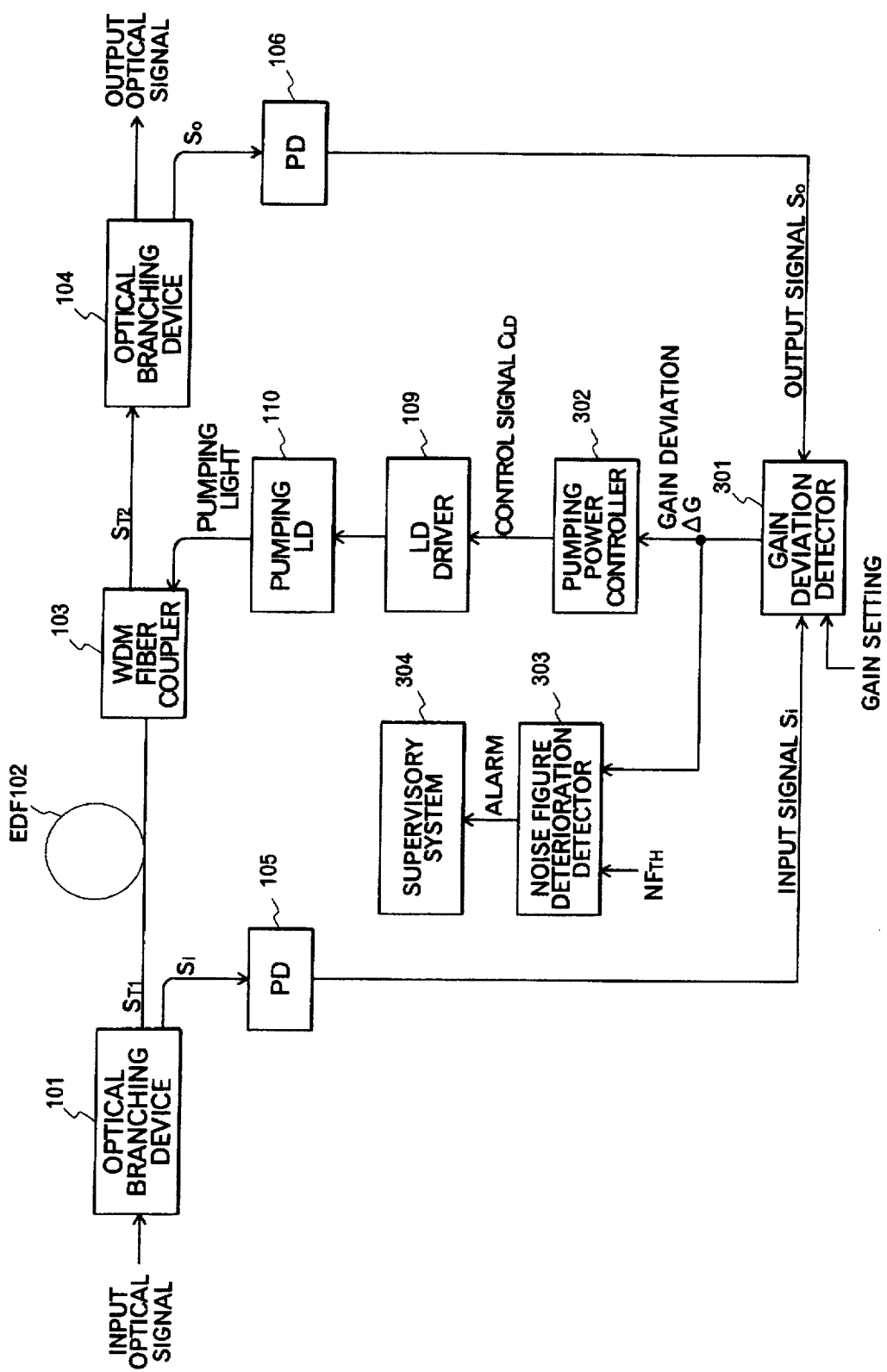
FIG. 4 is a block diagram showing a second embodiment of an in-line optical amplifier according to the present invention.

Referring to FIG. 4, where circuit blocks similar to those previously described with reference to FIG. 1 are denoted by the same reference numerals, receiving the input and output detection signals $S_i$ and $S_o$ from the photodiodes 105 and 106, respectively, a gain deviation detector 301 produces a gain deviation ΔG of the resultant gain G from a gain setting value. As described before, the resultant gain G of the in-line optical amplifier is a power ratio of the output detection signal $S_o$ to the input detection signal $S_i$. Using the gain deviation ΔG received from pumping power ion detector 301, a pumping power controller 302 controls the LD driver 109 such that the intensity of the pumping light is changed so as to reduce the gain deviation A G. The LD driver 109 outputs the drive current to a pumping source 110 such as a laser diode (LD) under the control of the pumping power controller 302. In this manner, the resultant gain of the in-line optical amplifier is kept at the predetermined level.

In this embodiment, the in-line optical amplifier in further provided with a noise figure deterioration detector 303 and a supervisory system 304. The noise figure deterioration detector 303 receives the gain deviation ΔG from the gain deviation detector 301 and produces an alarm signal by comparing the gain deviation ΔG to a noise figure threshold value $NF_{TH}$. More specifically, the noise figure deterioration detector 303 produces an alarm signal of the value 1 when the gain deviation ΔG exceeds the noise figure threshold value $NF_{TH}$ and an alarm signal of the value 0 when the gain deviation ΔG is equal to or smaller than the noise figure threshold value $NF_{TH}$. Such an alarm signal is used by the supervisory system 304 monitoring the operation state of the repeater so as to efficiently and reliably amplify the input optical signal.

Figure 5:
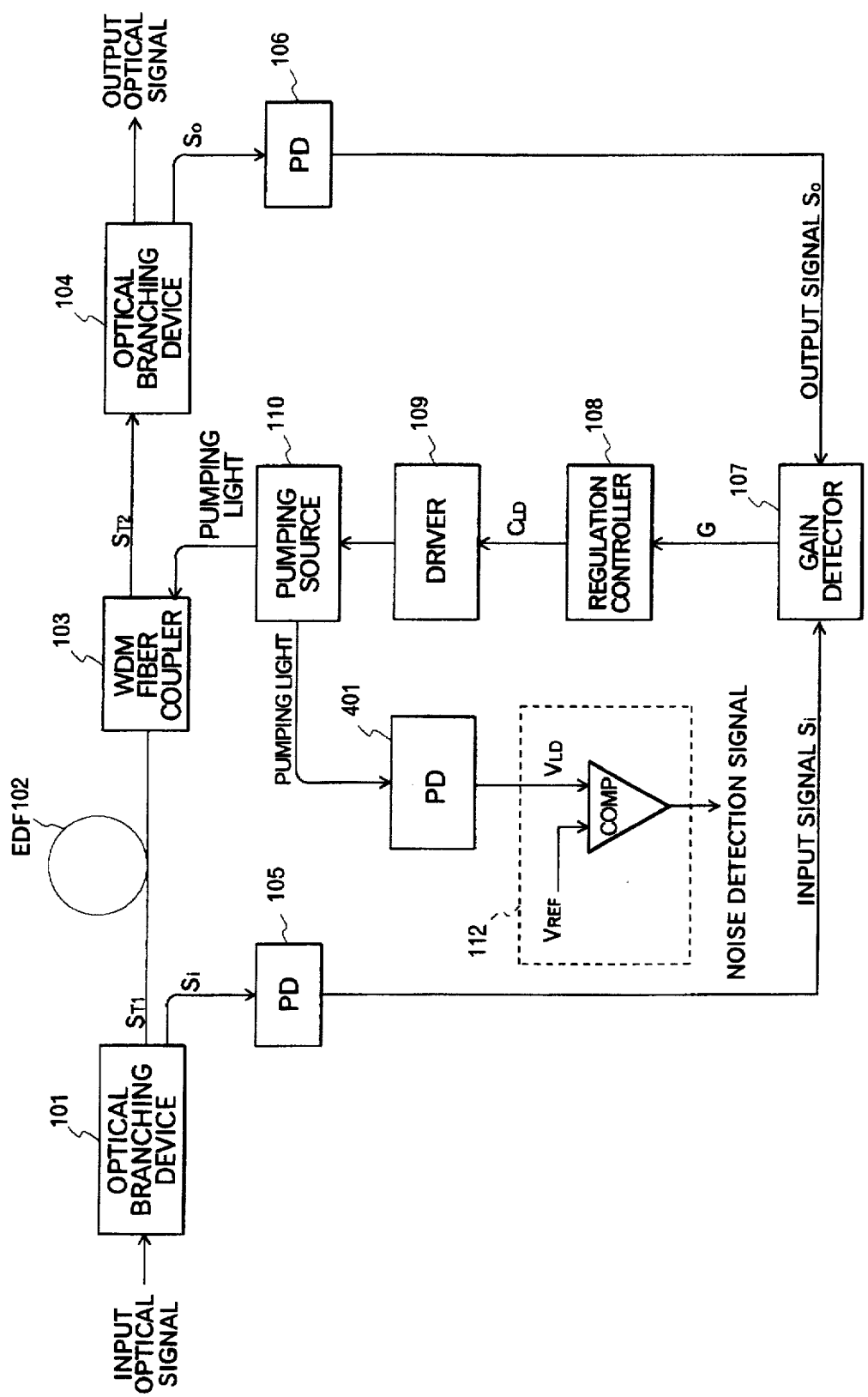
FIG. 5 is a block diagram showing a third embodiment of an in-line optical amplifier according to the present invention.

As shown in FIG. 5, where circuit blocks similar to those previously described with reference to FIG. 1 are denoted by the same reference numerals, the in-line optical amplifier according to the third embodiment is provided with a photodiode 401 for detecting the pumping light, instead of the drive current detector 111 as shown in FIG. 1. The photodiode 401 detects the intensity of the pumping light which is being generated by the pumping source 110 and produces the voltage $V_{LD}$ corresponding to the intensity of the pumping light which is currently supplied to the Er-doped fiber amplifier 102. The comparator 112, receiving the voltage $V_{LD}$ from the photodiode 401, compares it to the reference voltage $V_{REF}$ to produce a noise detection signal, as described before.

The in-line optical amplifier according to the present invention is preferably employed in each repeater of a multiple-repeater optical transmission system. Such a system will be described hereinafter, taking as an example a multiple-repeater optical transmission system described in the U.S. application Ser. No. 08/395,309 which was filed by the present inventor on Feb. 28, 1995.

Figure 6:
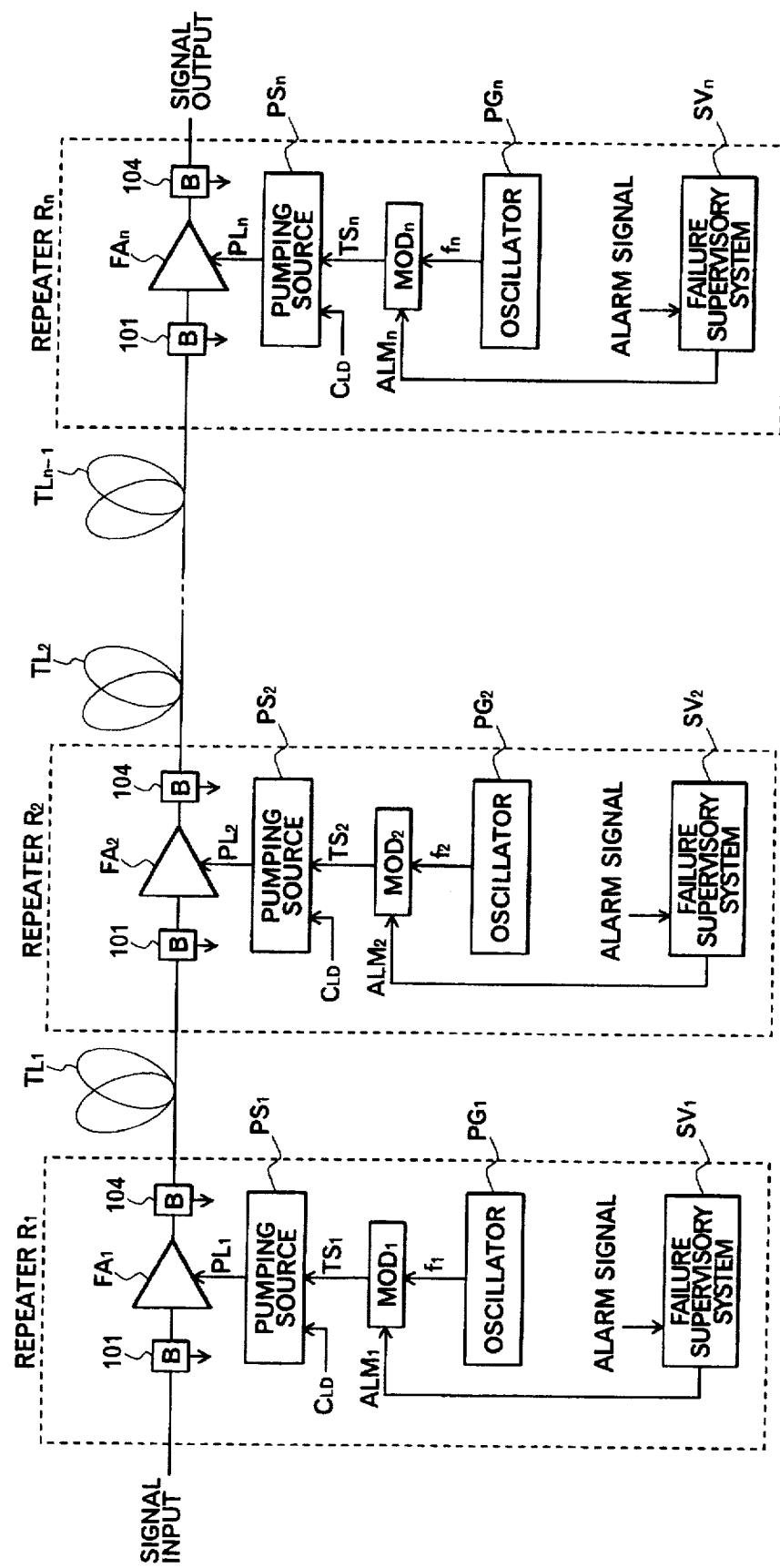
FIG. 6 is a schematic block diagram showing a multirepeater optical transmission system including a plurality of repeaters each comprising an in-line optical amplifier according to the present invention.

As shown in FIG. 6, in a multiple-repeater optical transmission system comprising a plurality of optical fiber transmission lines $TL_1$–$TL_n$ and a plurality of repeaters $R_1$–$R_n$ connecting adjacent transmission lines to each other, each repeater $R_i$ (i=1, 2, 3, ..., n) is comprised of a known failure supervisory system $SV_i$, an oscillator $PG_i$, a modulator $MOD_i$, a pumping source $PS_i$ (110), an optical fiber amplifier $FA_i$ (102, 103) and other necessary circuits (101, 104, and 105–109, 301–303, or 401) as shown in FIG. 1. For simplicity, the other circuits (101, 104, and 105–109, 301–303, or 401) as shown in FIG. 1 are not shown in FIG. 6. The intensity of pumping light $PL_i$ emitted from the pumping source $PS_i$ is adjusted by the regulation controller 108 or the pumping power controller 302 as described before.

When receiving the alarm signal from the comparator 112 or the noise figure deterioration detector 303 is the repeater $R_i$, the failure supervisory system $SV_i$ generates an alarm information signal $ALM_i$ indicating "abnormality". The oscillator $PG_i$ generates an oscillation wave having a frequency different from that of the oscillator $PG_j$ of another repeater $R_j$. The respective frequencies $f_1$–$f_n$ are previously assigned to the repeaters $R_1$–$R_n$.

The modulator $MOD_i$ frequency-modulates the oscillation wave of frequency $f_i$ generated by the oscillator $PG_i$ in accordance with the alarm information signal $ALM_i$, and supplies a modulated oscillation wave $TS_i$ to the pumping source $PS_i$. While the repeater $R_i$ does not suffer from internal optical losses and therefore the alarm information signal $ALM_i$ indicates "normal", the modulated oscillation wave $TS_i$ is, for instance, an oscillation wave having a predetermined constant frequency. The pumping source $PS_i$ emits pumping light $PL_i$ for pumping the optical fiber amplifier $FA_i$ in accordance with the control signal $C_{LD}$ and the frequency-modulated oscillation wave $TS_i$. The optical fiber amplifier $FA_i$ of each repeater $R_i$ amplifies the received main signal, and supplies the amplified main signal and the pumping light $PL_i$ to the downstream repeater $R_{i+1}$ via the transmission line $TL_i$. In this system, the wavelengths of the main signal light for transmission and the pumping light $PL_i$ for pumping the Er-doped fiber 102 are set at 1.52–1.55 μm and 1.46–1.48 μm, respectively.

A terminal administration station is connected to the optical fiber transmission line $TL_n$. Receiving signal light from the optical fiber transmission line $TL_n$, an optical receiver separates main signal light from the received light and converts it to an electrical signal. The separated main signal is decoded into an original data and the remaining of the input signal other than the main signal is frequency-divided into signal components $TS_1$–$TS_n$ of frequencies $f_1$–$f_n$, which are demodulated into alarm information signals $ALM_1$–$ALM_n$, respetively, which are output to an alarm information signal processor. If there exists an alarm information signal indicating "abnormality", the alarm information signal processor produces alarm information which specifies the repeater corresponding to the alarm information signal indicating "abnormality" and outputs it to a network controller.

In this manner, the terminal administration station can specify a repeater which is deteriorating in noise figure before the repeater suffers some failure.

Although the above embodiments employ the Er-doped fiber amplifier 102 as an in-line fiber amplifier, it is apparent that a rare-earth element doped fiber amplifier may be employed in place of the Er-doped fiber amplifier.

What is claimed is:

1. A circuit for optically amplifying an input optical signal to produce an output optical signal, comprising:

power detecting means for detecting an input power and an output power from the input optical signal and the output optical signal, respectively;

amplifying means for optically amplifying the input optical signal after the input power is detected with a gain varying in accordance with an intensity of pumping light;

gain detecting means for detecting a resultant gain of the circuit based on the input power and the output power;

gain control means for adjusting the intensity of the pumping light such that the resultant gain of the circuit is kept at a predetermined gain; and detecting means for detecting a physical quantity associated with a deviation of the resultant gain of the circuit from the predetermined gain.

2. The circuit according to claim 1, wherein the detecting means detects the intensity of the pumping light.

3. The circuit according to claim 1, wherein the detecting means detects a magnitude of current converted into the pumping light.

4. The circuit according to claim 1, wherein the detecting means detects the deviation of the resultant gain of the circuit from the predetermined gain.

5. The circuit according to claim 1, wherein the gain control means comprises:

light-emitting means for emitting the pumping light to the amplifying means, the intensity of the pumping light varying in accordance with a drive current supplied to the light emitting means; and control means for controlling the drive current such that the resultant gain of the circuit is kept at the predetermined gain.

6. The circuit according to claim 5, wherein the detecting means comprises a photodetector for detecting the intensity of the pumping light emitted from the light-emitting means.

7. The circuit according to claim 5, wherein the detecting means comprises a current detector for detecting the drive current supplied to the light-emitting means.

8. The circuit according to claim 5, wherein the detecting means comprises a gain deviation detector for detecting the deviation of the resultant gain of the circuit from the predetermined gain.

9. The circuit according to claim 1, further comprising:

determination means for determining whether the physical quantity exceeds a predetermined level.

10. The circuit according to claim 5, further comprising:

determination means for determining whether the physical quantity exceeds a predetermined level.

11. The circuit according to claim 10, wherein:

the detecting means comprises a photodetector for detecting the intensity of the pumping light emitted from the light-emitting means; and the determination circuit determines whether the intensity of the pumping light exceeds a predetermined intensity level.

12. The circuit according to claim 10, wherein:

the detecting means comprises a current detector for detecting the drive current supplied to the light-emitting means; and the determination circuit determines whether the drive current exceeds a predetermined current level.

13. The circuit according to claim 10, wherein:

the detecting means comprises a gain deviation detector for detecting the deviation of the resultant gain of the circuit from the predetermined gain; and the determination circuit determines whether the gain deviation exceeds a predetermined threshold.

14. The circuit according to claim 9, wherein the determination circuit produces a noise detection signal when the physical quantity exceeds a predetermined level, the noise detection signal indicating that an optical loss occurs within the circuit.

15. The circuit according to claim 9, wherein the determination circuit produces an alarm signal when the physical quantity exceeds a predetermined level, the alarm signal indicating that a noise figure of the circuit is deteriorated.

16. The circuit according to claim 10, wherein the determination circuit produces a noise detection signal when the physical quantity exceeds a predetermined level, the noise detection signal indicating that an optical loss occurs within the circuit.

17. The circuit according to claim 10, wherein the determination circuit produces an alarm signal when the physical quantity exceeds a predetermined level, the alarm signal indicating that a noise figure of the circuit is deteriorated.

18. The circuit according to claim 5, wherein the power detecting means comprises:

an input optical element provided at an input end of the circuit;

an input power detecting means for detecting the input power from the input optical signal passing through the input optical element;

an output optical element provided at an output end of the circuit; and an output power detector for detecting the output power from the output optical signal passing through the output optical element.

19. The circuit according to claim 10, wherein the power detecting means comprises:

an input optical element provided at an input end of the circuit;

an input power detecting means for detecting the input power from the input optical signal passing through the input optical element;

an output optical element provided at an output end of the circuit; and an output power detector for detecting the output power from the output optical signal passing through the output optical element.

20. The circuit according to claim 18, wherein the amplifying means comprises:

a rare-earth element doped fiber for amplifying the input optical signal passing through the input optical element; and coupling means connected to the rare-earth element doped fiber at an output end, for coupling the pumping light with a signal amplified by the rare-earth element doped fiber.

21. The circuit according to claim 19, wherein the amplifying means comprises:

a rare-earth element doped fiber for amplifying the input optical signal passing through the input optical element; and coupling means connected to the rare-earth element doped fiber at an output end, for coupling the pumping light with a signal amplified by the rare-earth element doped fiber.

22. An in-line optical amplifier for amplifying an input optical signal to produce an output optical signal, comprising:

an input power detector for detecting the input power from the input optical signal;

a rare-earth element doped fiber for optically amplifying the input optical signal after the input power is detected with a gain varying in accordance with an intensity of pumping light;

a light source for supplying the pumping light to the rare-earth element doped fiber;

an output power detector for detecting the output power from the output optical signal;

a gain detector for detecting an overall gain of the in-line optical amplifier based on the input power and the output power;

a gain regulator for adjusting the intensity of the pumping light such that the overall gain is kept at a predetermined gain; and a noise level detector for detecting an internal noise level based on a physical quantity associated with a deviation of the overall gain from the predetermined gain.

23. The in-line optical amplifier according to claim 22, wherein the noise level detector comprises:

a photodetector for detecting an intensity of the pumping light emitted from the light source; and a determination circuit for determining whether the intensity of the pumping light exceeds a predetermined intensity level.

24. The in-line optical amplifier according to claim 22, wherein the noise level detector comprises:

a current detector for detecting a drive current supplied to the light source; and a determination circuit for determining whether the drive current exceeds a predetermined current level.

25. The in-line optical amplifier according to claim 22, wherein the noise level detector comprises:

a gain deviation detector for detecting a deviation of the resultant gain of the circuit from the predetermined gain; and a determination circuit for determining whether the deviation exceeds a predetermined level.

26. An in-line optical amplifier comprising:

an input branching device for branching an input optical signal into a first input signal and a second input signal;

an input detector for detecting an input intensity level from the first input signal;

a rare-earth element doped fiber for optically amplifying the second input signal with a gain varying in accordance with an intensity of pumping light and producing a third signal;

an optical coupler for coupling the third signal with the pumping light;

a pumping source for supplying the pumping light to the rare-earth element doped fiber through the optical coupler;

an output detector for detecting an output intensity level from an output optical signal passing through the optical coupler;

a gain detector for detecting an overall gain of the in-line optical amplifier based on the input intensity level and the output intensity level;

a gain regulator for adjusting the intensity of the pumping light such that the overall gain is kept at a predetermined gain; and a noise level detector for detecting an internal noise level based on a physical quantity associated with a deviation of the overall gain from the predetermined gain.

27. The in-line optical amplifier according to claim 26, wherein the noise level detector comprises:

a photodetector for detecting an intensity of the pumping light emitted from the pumping source; and a determination circuit for determining whether the intensity of the pumping light exceeds a predetermined intensity level.

28. The in-line optical amplifier according to claim 26, wherein the noise level detector comprises:

a current detector for detecting a drive current supplied to the pumping source; and a determination circuit for determining whether the drive current exceeds a predetermined current level.

29. The in-line optical amplifier according to claim 26, wherein the noise level detector comprises:

a gain deviation detector for detecting a deviation of the resultant gain of the circuit from the predetermined gain; and a determination circuit for determining whether the deviation exceeds a predetermined level.

30. A method for detecting an internal noise in an in-line optical amplifier which optically amplifies an input optical signal to produce an output optical signal, the method comprising the steps of:

detecting an input power from the input optical signal;

amplifying the input optical signal after the input power is detected with a gain varying in accordance with an intensity of pumping light;

detecting an output power from the output optical signal;

detecting a resultant gain of the circuit based on the input power and the output power;

adjusting the intensity of the pumping light such that the resultant gain of the in-line optical amplifier is kept at a predetermined gain; and detecting a physical quantity associated with a deviation of the resultant gain of the in-line optical amplifier from the predetermined gain.

31. The method according to claim 30, wherein the physical quantity is the intensity of the pumping light.

32. The method according to claim 30, wherein the physical quantity is a magnitude of current converted into the pumping light.

33. The method according to claim 30, wherein the physical quantity is the deviation of the resultant gain from the predetermined gain.

34. The method according to claim 30, further comprising a determination step of determining whether the physical quantity exceeds a predetermined level.

35. The method according to claim 34, wherein the determination step produces a noise detection signal when the physical quantity exceeds a predetermined level, the noise detection signal indicating that an optical loss occurs within the in-line optical amplifier.

36. The method according to claim 34, wherein the determination step produces an alarm signal when the physical quantity exceeds a predetermined level, the alarm signal indicating that a noise figure of the in-line optical amplifier is deteriorated.

* * * * *